(12) United States Patent
Sigl

(10) Patent No.: US 12,469,637 B2
(45) Date of Patent: Nov. 11, 2025

(54) HIGH-FREQUENCY TRANSFORMERS USING SOLID WIRE FOR WELDING-TYPE POWER SUPPLIES

(71) Applicant: Illinois Tool Works Inc., Glenview, IL (US)

(72) Inventor: Dennis Roland Sigl, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 398 days.

(21) Appl. No.: 17/509,847

(22) Filed: Oct. 25, 2021

(65) Prior Publication Data

US 2022/0044867 A1    Feb. 10, 2022

Related U.S. Application Data

(63) Continuation of application No. 16/144,535, filed on Sep. 27, 2018, now Pat. No. 11,239,026.

(Continued)

(51) Int. Cl.
*H01F 27/24* (2006.01)
*B23K 9/10* (2006.01)
(Continued)

(52) U.S. Cl.
CPC ......... *H01F 38/085* (2013.01); *B23K 9/1006* (2013.01); *B23K 9/1043* (2013.01);
(Continued)

(58) Field of Classification Search
CPC .................................. H01F 27/2823
(Continued)

(56) References Cited

U.S. PATENT DOCUMENTS 1,799,903 A * 4/1931 Holslag ................. H01F 38/085
                                                            336/146
4,174,510 A    11/1979 Helenberg
(Continued)

FOREIGN PATENT DOCUMENTS

CH          221841     6/1942
CN        202150340    2/2012
(Continued)

OTHER PUBLICATIONS

European Office Communication with extended Search Report Appln No. 22187937.2 dated Sep. 12, 2022.

(Continued)

*Primary Examiner* — Ronald Hinson
(74) *Attorney, Agent, or Firm* — McAndrews, Held & Malloy, Ltd.

(57) ABSTRACT

High-frequency transformers using solid wire for welding-type power supplies are disclosed. An example welding-type power supply transformer includes: a first coil assembly comprising a first plurality of turns of a first solid wire wrapped around a first bobbin to form a first single-layer primary winding, and a second plurality of turns of a second conductor over the first plurality of turns to form a first single-layer secondary winding; a second coil assembly comprising a third plurality of turns of a second solid wire wrapped around a second bobbin to form a second single-layer primary winding, and a fourth plurality of turns of the second conductor over the third plurality of turns to form a second single-layer secondary winding, the first single-layer primary winding being in parallel with the second single-layer primary winding, wherein the second conductor comprises at least one of an obround cross-section, a rectangular cross-section, or a rectangular cross-section having radiused corners, the second plurality of turns have a transverse cross-section of the second conductor that is constant along (Continued)

at least the portion of the second conductor comprising the second plurality of turns, and the fourth plurality of turns have a transverse cross-section of the second conductor that is constant along at least the portion of the second conductor comprising the fourth plurality of turns; and first and second cores disposed at least partially within the first and second bobbins.

18 Claims, 7 Drawing Sheets

Related U.S. Application Data

(60) Provisional application No. 62/565,615, filed on Sep. 29, 2017.

(51) Int. Cl.
  *H01F 27/28* (2006.01)
  *H01F 27/32* (2006.01)
  *H01F 38/08* (2006.01)
  *H01F 27/40* (2006.01)

(52) U.S. Cl.
  CPC ..... *H01F 27/2823* (2013.01); *H01F 27/2866* (2013.01); *H01F 27/325* (2013.01); *H01F 27/40* (2013.01)

(58) Field of Classification Search
  USPC ......................................................... 336/212
  See application file for complete search history.

(56) References Cited

U.S. PATENT DOCUMENTS

| | | | |
|---|---|---|---|
| 4,249,229 A | 2/1981 | Hester | |
| 4,311,978 A | 1/1982 | Crockett | |
| 4,562,382 A | 12/1985 | Elliott | |
| 5,847,518 A * | 12/1998 | Ishiwaki | H01F 3/14 315/276 |
| 6,611,189 B2 | 8/2003 | Sigl | |
| 6,864,777 B2 | 3/2005 | Sigl | |
| 6,998,573 B2 * | 2/2006 | Kooken | H01F 38/085 336/186 |
| 7,978,040 B2 | 7/2011 | Solar | |
| 8,587,399 B2 | 11/2013 | Crutcher | |
| 2002/0175798 A1 | 11/2002 | Sigl | |
| 2004/0095221 A1 * | 5/2004 | Sigl | H01F 5/02 336/198 |
| 2004/0119572 A1 | 6/2004 | Sigl | |
| 2004/0150501 A1 * | 8/2004 | Hoffman | H01F 27/263 336/198 |
| 2008/0231408 A1 * | 9/2008 | Wang | H01F 27/2804 336/200 |
| 2009/0309684 A1 * | 12/2009 | Tsai | H01F 27/325 336/105 |
| 2016/0276088 A1 * | 9/2016 | Kwon | H01F 41/0246 |
| 2017/0110235 A1 | 4/2017 | Yoshioka | |
| 2017/0214330 A1 * | 7/2017 | Yang | H01F 37/00 |

FOREIGN PATENT DOCUMENTS

| | | |
|---|---|---|
| CN | 105118628 | 12/2015 |
| DE | 136197 | 6/1979 |
| DE | 3103672 | 9/1982 |
| EP | 1434241 | 6/2004 |
| EP | 3142130 | 3/2017 |
| GB | 2230208 | 10/1990 |
| JP | 2014216522 | 11/2014 |
| JP | 2015153802 | 8/2015 |
| JP | 2017041531 | 2/2017 |
| KR | 20070121480 | 12/2007 |

OTHER PUBLICATIONS

Images of High-Frequency Transformer from within Lincoln Powerwave 650 Power Source. Captured Sep. 27, 2018. (1 pg).
Images of High-Frequency Transformer from within Lincoln_V250 Power Source. Captured Sep. 27, 2018. (1 bg).
Images of High-Frequency Transformer from within Miller Diversion 180. Captured Sep. 27, 2018. (1 pg).
Int'l Search Report and Written Opinion Appln. PCT/US2018/053317 dated Jan. 22, 2019 (26 pgs).

* cited by examiner

HIGH-FREQUENCY TRANSFORMERS USING SOLID WIRE FOR WELDING-TYPE POWER SUPPLIES

RELATED APPLICATIONS

This patent is a continuation of U.S. patent application Ser. No. 16/144,535, filed Sep. 27, 2018, which claims priority to U.S. Provisional Patent Application Ser. No. 62/565,615, filed Sep. 29, 2017, entitled "High-Frequency Transformers Using Solid Wire for Welding-Type Power Supplies." The entireties of U.S. Provisional Patent Application Ser. No. 62/565,615 and U.S. patent application Ser. No. 16/144,535 are incorporated herein by reference.

BACKGROUND

This disclosure relates generally to electromagnetic transformers and, more particularly, to high-frequency transformers using solid wire for welding-type power supplies.

High-frequency transformers operating at high voltages and high currents are used in conventional welding power supplies. The output stage of a welding power supply, for example, may include an electromagnetic transformer to transform a higher bus voltage of a welding power supply into a high current welding output. Transformer primary coil voltages on the order of 465 volts at 20 to 100 Khz and secondary coil currents on the order of 400 amps may occur.

Modern transformers use Litz wire in high frequency welding transformers. Litz wire is very expensive, difficult to terminate, but very flexible. Litz wire is constructed from individual bundles of twisted groups of insulated small gauge magnet wire. The construction of Litz wire has the effect of averaging out the magnetic field, thereby inducing current to flow more or less evenly thru all the strands as if the Litz wire was carrying DC instead of high frequency AC current. Litz wire is easy to wind onto a bobbin and can be easily routed throughout a welding power supply.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
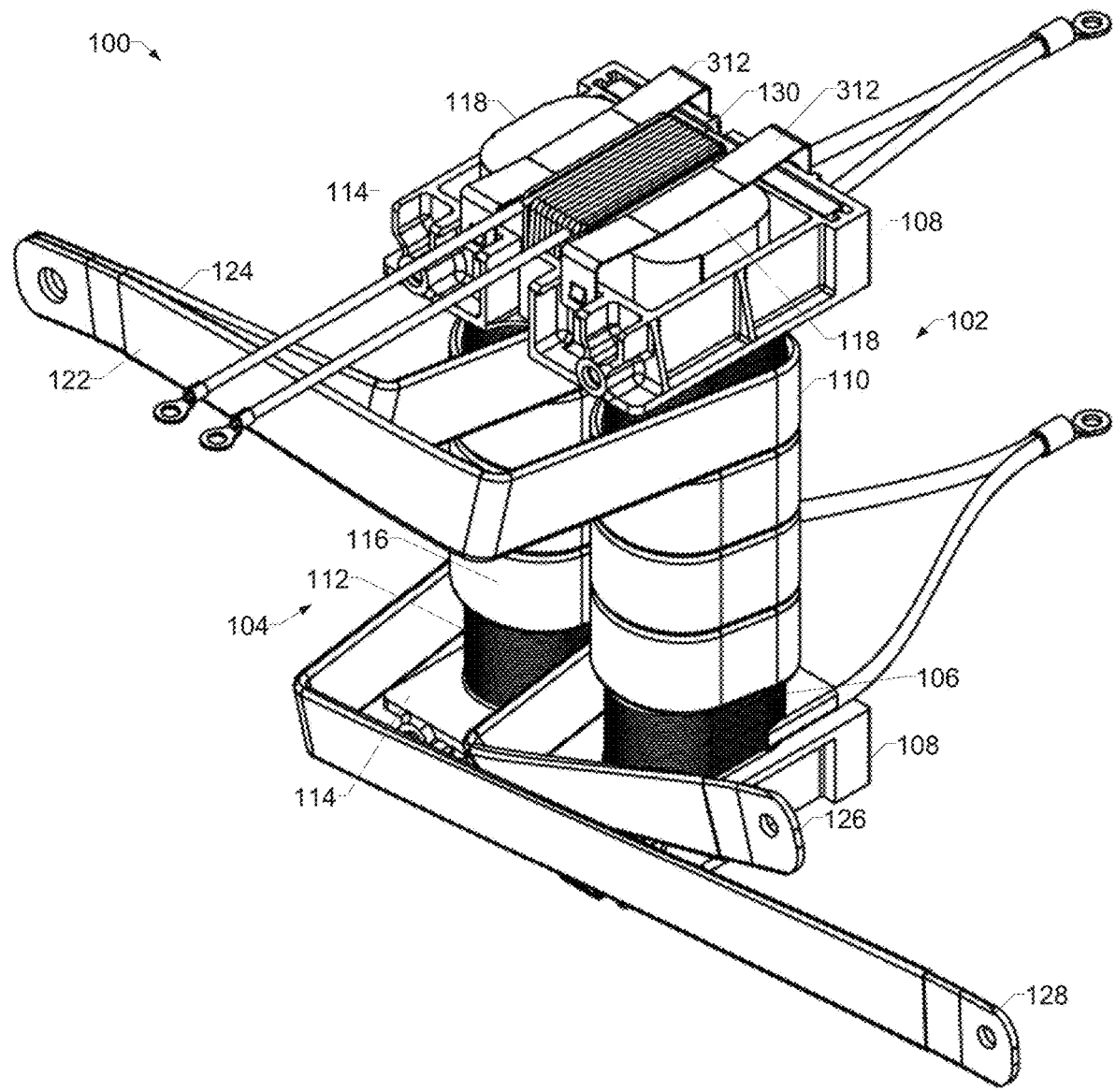
FIG. 1 is an assembled view of an example solid wire transformer, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As utilized herein the terms "circuits" and "circuitry" refer to physical electronic components (i.e. hardware) and any software and/or firmware (code) that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding-type power supply transformers include first and second coil assemblies, and first and second cores disposed within first and second bobbins. The example first coil assembly includes a first plurality of turns of a first solid wire wrapped around the first bobbin to form a first single-layer primary winding, and a second plurality of turns of a second conductor over the first plurality of turns to form a first single-layer secondary winding. The second coil assembly includes a third plurality of turns of a second solid wire wrapped around a second bobbin to form a second single-layer primary winding, and a fourth plurality of turns of the second conductor over the third plurality of turns to form a second single-layer secondary winding.

In some examples, the first solid wire includes solid magnet wire or extruded or rolled aluminum. In some examples, the first ferrite core comprises a first U-core and the second ferrite core comprises a second U-core, in which the first and second U-cores are configured to be inserted into each of the first and second bobbins. Some such examples further include a tertiary winding wound around a bridge portion of the first U-core. Some example transformers further include a shading ferrite to increase a leakage inductance of the tertiary winding.

In some example transformers, the first single-layer secondary winding is coupled in series with the second single-layer secondary winding to form a multi-core secondary winding having a center-tap. In some examples, the first single-layer primary winding has first insulation, the first single-layer secondary winding has second insulation, and the first single-layer secondary winding is wound around the first single-layer primary winding.

In some example transformers, the secondary winding includes extruded aluminum or extruded copper. In some such examples, the secondary winding includes at least one of an obround cross-section, a rectangular cross-section, or a rectangular cross-section having radiused corners. Some example transformers further include polyethylene terephthalate (PET) tubing around at least portions of the first and second secondary windings that are adjacent the first and second primary windings. Some example transformers include polyethylene terephthalate (PET) film wrapped around at least portions of the first and second secondary windings adjacent the first and second primary windings.

In some examples, each of the first plurality of turns of the first solid wire includes parallel windings of the first solid wire. In some examples, the first and second bobbins are mechanically coupled when the first and second cores are positioned within the first and second bobbins. In some examples, the first single-layer primary winding is coupled in series with the second single-layer primary winding to form a multi-core primary winding. In some examples, the first and second ferrite cores and the first and second bobbins have obround cross-sections.

Disclosed example welding-type power supplies include a switched mode power supply circuit to convert input power at a first voltage and a first frequency to a second voltage and a second frequency, and a high-frequency transformer to convert the second voltage at the second frequency to an output current. The high-frequency transformer includes first and second coil assemblies, and first and second cores disposed within first and second bobbins. The example first coil assembly includes a first plurality of turns of a first solid wire wrapped around the first bobbin to form a first single-layer primary winding, and a second plurality of turns of a second conductor over the first plurality of turns to form a first single-layer secondary winding. The second coil assembly includes a third plurality of turns of a second solid wire wrapped around a second bobbin to form a second single-layer primary winding, and a fourth plurality of turns of the second conductor over the third plurality of turns to form a second single-layer secondary winding.

In some examples, the first bobbin includes mounting feet configured to secure the high-frequency transformer to the welding-type power supply. In some examples, the first bobbin includes one or more clips configured to cooperate with the first and second bobbins to secure the first and second cores to the first and second bobbins.

Another disclosed welding-type power supply transformer includes: a first coil assembly comprising a first plurality of turns of a first solid wire wrapped around a first bobbin to form a first single-layer primary winding, and a second plurality of turns of a second conductor around the first bobbin to form a first single-layer secondary winding; a second coil assembly comprising a third plurality of turns of a second solid wire wrapped around a second bobbin to form a second single-layer primary winding, and a fourth plurality of turns of the second conductor around the second bobbin to form a second single-layer secondary winding; and first and second cores disposed at least partially within the first and second bobbins.

In some examples, the first plurality of turns and the second plurality of turns are wrapped around at least a same portion of the first bobbin, and the third plurality of turns and the fourth plurality of turns are wrapped around at least a same portion of the second bobbin.

Figure 2:
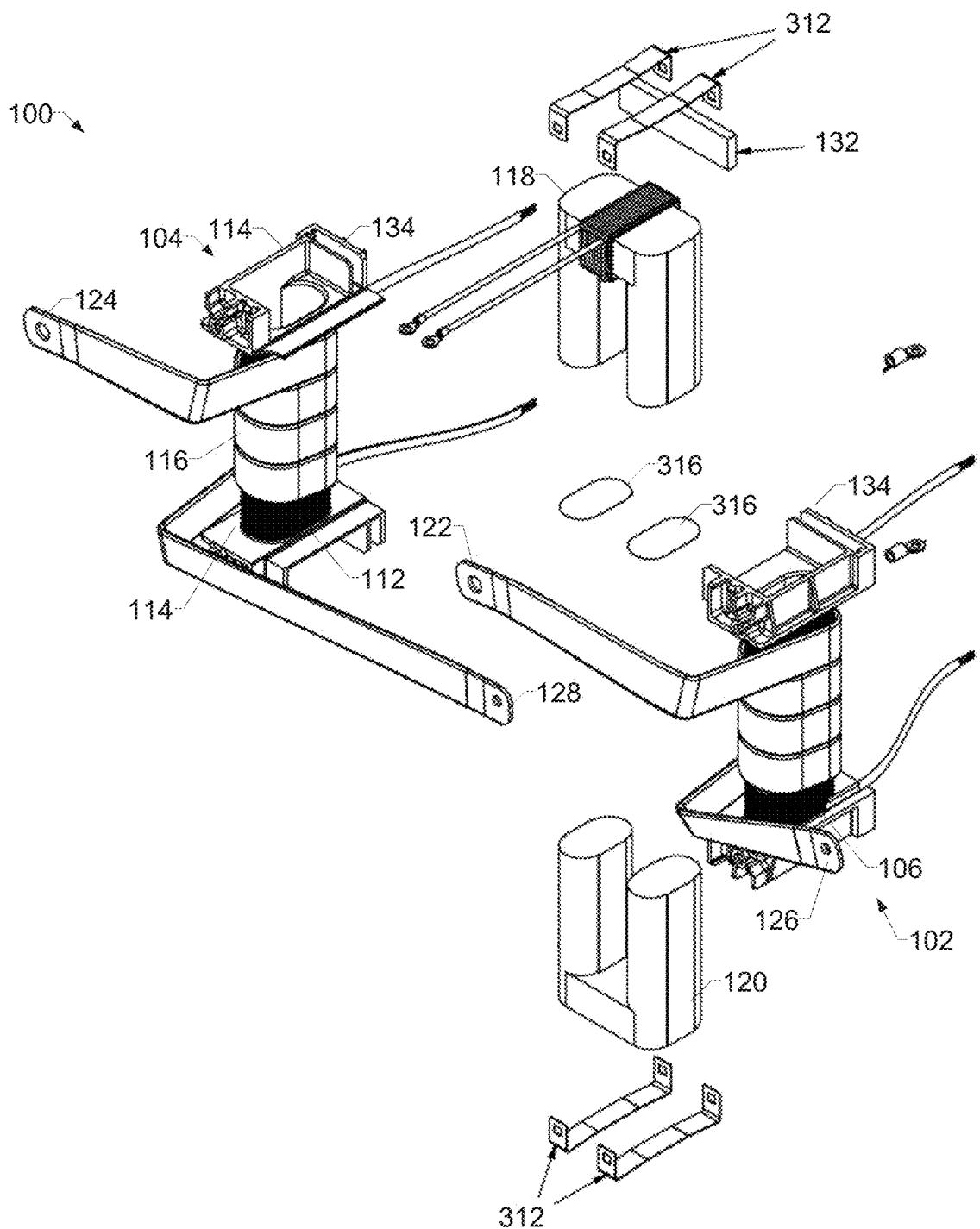
FIG. 2 is a partially exploded view of the example solid wire transformer of FIG. 1.

FIG. 1 is an assembled view of an example solid wire transformer 100. FIG. 2 is a partially exploded view of the example solid wire transformer 100 of FIG. 1. The example solid wire transformer 100 of FIG. 1 includes a front coil assembly 102 and a rear coil assembly 104. The front coil assembly 102 has first turns of solid wire 106 wrapped around a front bobbin 108 to form a first single-layer primary winding. The front coil assembly 102 has second turns of a conductor 110 over the first turns of solid wire 106 to form a first single-layer secondary winding. Similarly, the rear coil assembly 104 has third turns of solid wire 112 wrapped around a rear bobbin 114 to form a second single-layer primary winding, and fourth turns of second conductor 116 over the solid wire 112 to form a second single-layer secondary winding. The example solid wire transformer 100 further includes first and second cores 118, 120 (e.g., ferrite cores) disposed at least partially within the front and rear bobbins 108, 114. The example solid wire 106, 112 may be magnet wire, extruded aluminum wire, rolled aluminum wire, and/or other types of solid wire. The solid wire 106, 112 may be provided with turn-to-turn insulation, such as enameled insulation, extruded insulation, and/or other types of insulation, and which may be added to the wire at the time of construction of the wire and/or subsequently but prior to winding of the solid wire 106, 112. In some other examples, alternative methods of providing turn-to-turn insulation may be provided, such as by molding the bobbins 108, 114 to separate the turns of the solid wire 106, 112.

The example transformer 100 of FIG. 1 is substantially lower in production costs (e.g., materials and/or manufacturing costs) than transformers having similar specifications using Litz wire, and have adequate thermal performance. The construction of the example transformer 100 addresses several of the problems normally associated with using solid wire. For example, the transformer 100 is wound such that the solid wire 106, 112 are arranged on the bobbins 108, 114, making termination and/or routing of the solid wire 106, 112 easier than using Litz wire. As discussed below, the bobbins 108, 114 have features for mounting the completed transformer 100 to a welding-type power supply, such as on a circuit board or to a plastic or sheet metal chassis. The transformer 100 has lower cost primary-to-secondary insulation that also functions as a sleeve on the secondary winding conductors 110, 116 as the conductors 110, 116 are routed within a power supply.

The example cores 118, 120 are U-shaped ferrite cores, each with an obround cross section that making the windings (e.g., the wires 106, 112 and the conductors 110, 116) easier to wind. Each of the two bobbins 108, 114 fits over each leg of the U-shaped core 118, 120. In some other examples, the cores 118, 120 may be differently shaped, such as using E-cores (with the appropriate cross-sectional area). In the example of FIG. 1, each bobbin 108, 114 has the primary winding (e.g., the solid wires 106, 112) placed under a secondary winding (e.g., the conductors 110, 116). In other words, the secondary winding is wound over the primary winding on each of the bobbins 108, 114.

In the example of FIGS. 1 and 2, the solid wires 106, 112 of the primary windings are coupled in parallel. However, the primary windings may be placed in series. The conductors 110, 116 of the secondary windings are connected in series in a center-tapped configuration. For example, first ends 122, 124 of the respective conductors 110, 116 of the secondary are coupled to form a center-tap, and second ends 126, 128 of the respective conductors 110, 116 are connected to different components of the power supply (e.g., to rectifiers and/or to output terminals of a welding-type power supply).

The example transformer 100 of FIGS. 1 and 2 include a tertiary winding 130, wound using solid wire, and placed on the bridge (e.g., middle leg) of the example core 118. The positioning of the example tertiary winding 130 enables omission of a separate inductor that may be required in conventional transformers that use Litz wire. The placement of the tertiary winding 130 at one end of the transformer 100 (e.g., removed from the primary windings), increases leakage inductance with the primary coils. To further increase the leakage inductance, an additional rectangular ferrite rod 132 is placed in the pockets 134 of the bobbins 108, 114. The ferrite rod 132 may further tune the leakage inductance to the final value specified for a particular circuit. The ferrite rod 132 may be secured by, for example, a length of PET or glass filament film.

Figure 3:
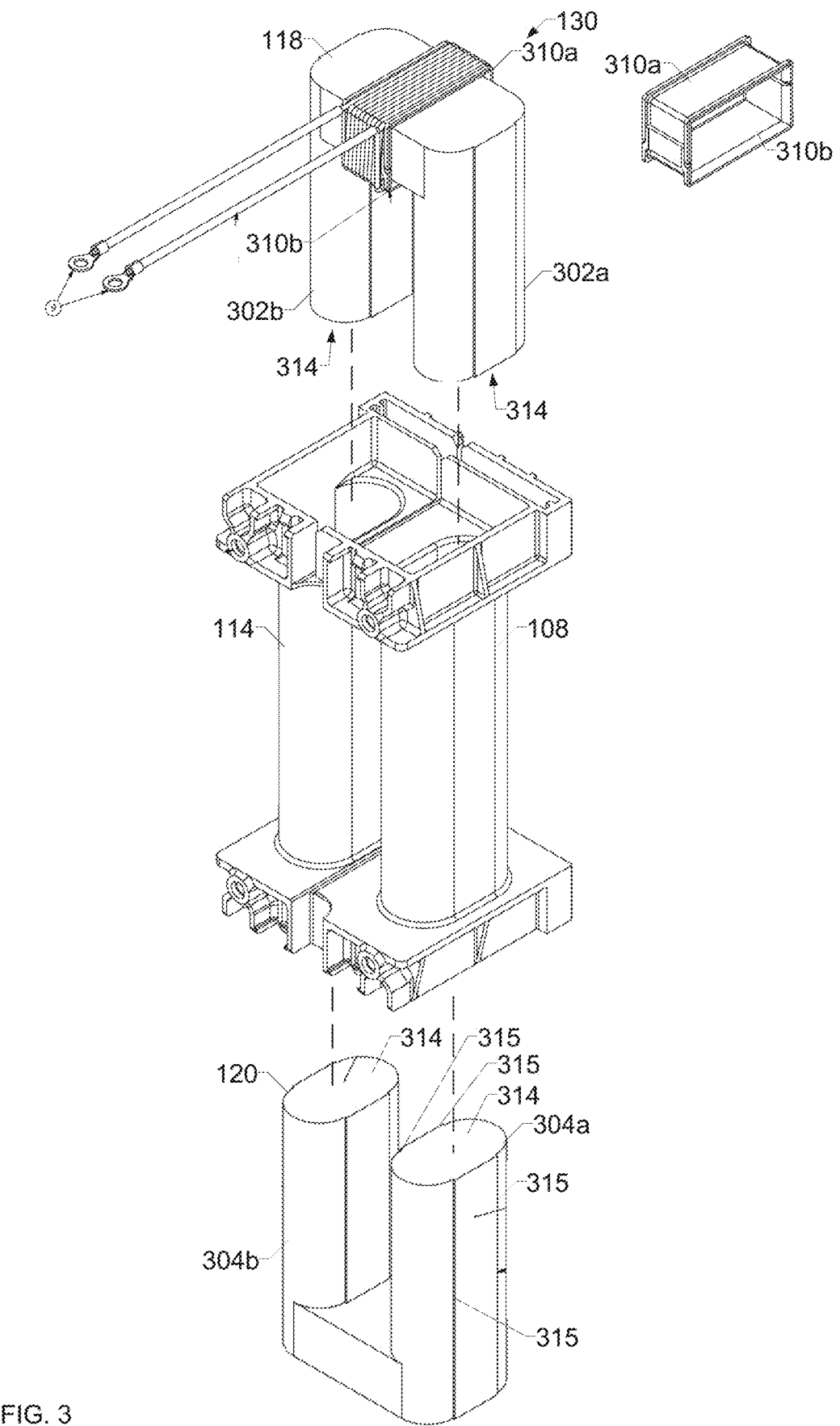
FIG. 3 is another view of the example bobbins, the example U-cores, and the example tertiary winding of the solid wire transformer of FIG. 1.

FIG. 3 is another view of the example bobbins 108, 114, the example U-cores 118, 120, and the example tertiary winding 130 of the solid wire transformer 100 of FIGS. 1 and 2.

Leg portions 302a, 302b, 304a, 304b of the example U-shaped cores 118, 120 each have an obround cross section. The obround cross-sections of the leg portions 302a-304b substantially match obround cross-sections of the bobbins 108, 114 into which the leg portions 302a-304b are inserted. The example bobbins 108, 114 are identical and have complementary end sections 306a, 306b, 308a, 308b, such that opposite ends of the bobbins 108, 144 nest. Thus, the bobbins 108, 114 may be produced using a single molding tool. In other examples, the bobbins 108, 114 may have different features.

The tertiary winding 130 uses a pair of symmetric bobbins 310a, 310b. The example tertiary winding 130 uses magnet wire, glass sleeving, and a pair of ring terminals. The tertiary winding 130 is secured to the bobbins 310a, 310b using tape.

The cores 118, 120 are held in place with spring clips 312 that engage detents on the bobbins 108, 114. The spring clips 312 eliminate the need for mounting brackets and/or screws to clamp the cores 118, 120 together. To enable the use of the spring clips 312, the cores 118, 120 are ground on the front and/or back faces so the overall length of the legs is held to a tight tolerance (e.g., +/−0.005 inches). The spring clips 312 also exert high enough contact pressures to keep the faces 314 of the cores 118, 120 in contact. In addition to the spring clips 312, strips of PET tape with continuous glass stranding may be wrapped around the spring clips 312 and/or the transformer 100 to assist the spring clips 312 and cores 118, 120 stay in place. Use of the clips 312 and/or tape strips to hold the cores 118, 120 and/or the ferrite 132 together reduces or eliminates the need for brackets, long bolts, and/or other larger attachment hardware to hold the transformer 100 components together.

The example cores 118, 120 are effectively gapped by a pair of 0.005″ spacers 316, which may be made of PET or another material. The gap tunes the primary magnetizing inductance. The obround profile of the cores 118, 120, improves the ease, speed, and/or efficiency of winding. The obround profile reduces or eliminates free rotation of the wires 106, 112 of the primary windings and/or the secondary conductors 110, 116 around the obround shape, thereby reducing or eliminating tape required to keep the coil assemblies 102, 104 in place. The obround profile reduces or eliminates coil bulging, and may reduce manual post-winding pounding and/or reforming operations that may needed using different profiles (e.g., if the profile were rectangular or square). In some examples, the cores 118, 120 are pressed on their sides and are not perfectly obround. For example, the cores 118, 120 and/or the bobbins 108, 114 may include some flat areas 315 where the semicircle and flat areas converge, in order to extend the life of the tooling used to produce the ferrite core.

The example bobbins 108, 114, have bosses that enable use of self-tapping screws to mount the transformer 100 onto a circuit board or to a plastic or sheet metal chassis. The bobbins 108, 114 reduce or eliminate the need for mounting brackets. The bobbins 108, 114 may have excess material on the ends to stiffen the ends and/or to provide extra creepage distance to meet applicable standards (e.g., IEC standards).

Figure 4:
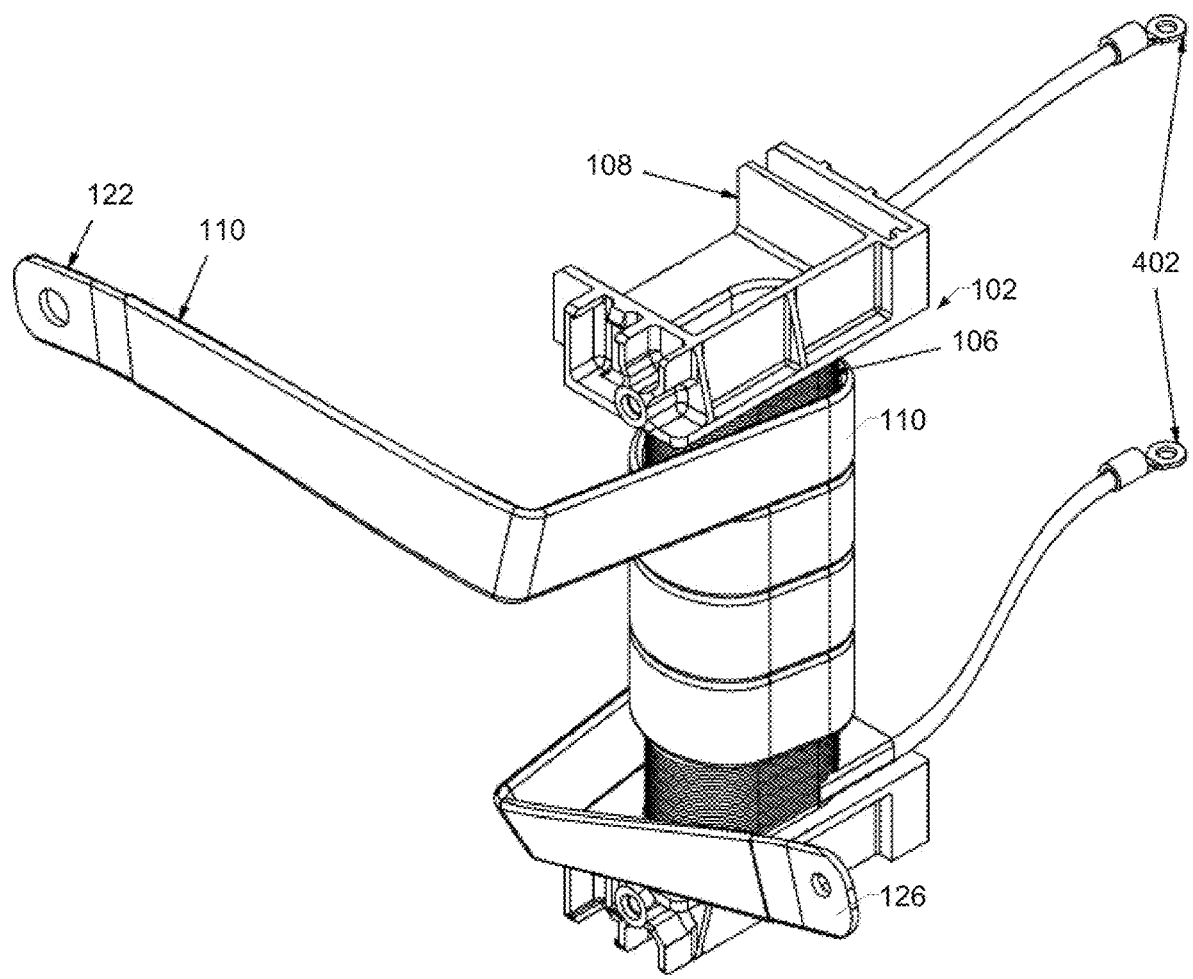
FIG. 4 is a view of the front coil assembly and the front bobbin of FIG. 1.
Figure 5:
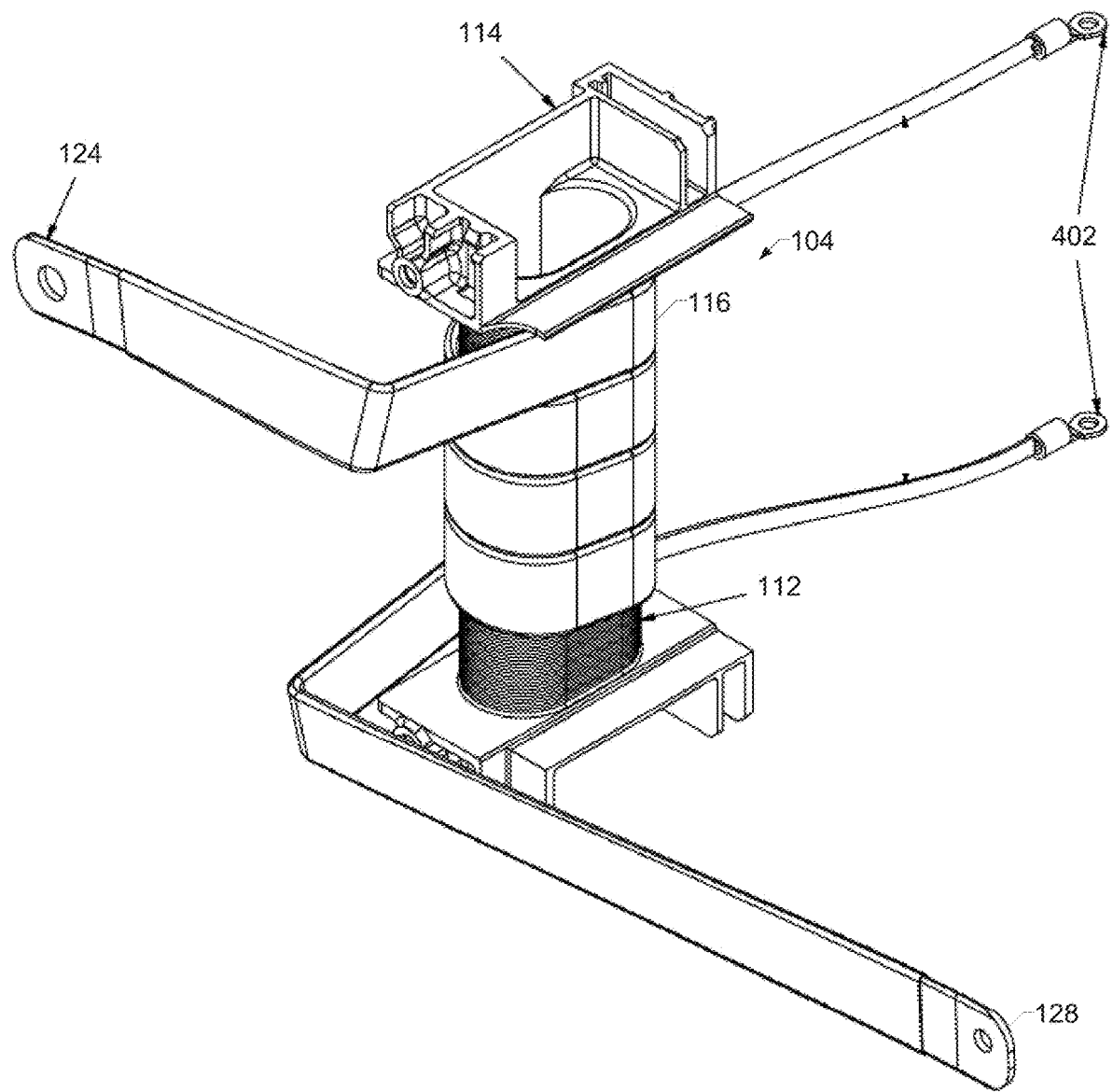
FIG. 5 is a view of the rear coil assembly and the rear bobbin of FIG. 1.

FIG. 4 is a view of the front coil assembly and the front bobbin of FIG. 1. FIG. 5 is a view of the rear coil assembly and the rear bobbin of FIG. 1.

The primary windings of the two coil assemblies 102, 104 are connected in parallel by terminating the wires 106, 112 with terminals 402. For example, the terminals 402 may be connected by crimping to ends of the magnet wire from which the insulation has been stripped off, crimping the terminals through the insulation of the wire (e.g., by the use of a Tyco Copalum-type terminal), using a spot welding-type crimper that melts the enamel covering as the terminal is crimped onto the wires, and/or any other termination technique.

The winding directions of the wires 106, 112 of the primary windings are opposite, so that the terminals 402 of the different primary windings that are on the same ends of the transformer 100 may be coupled in parallel. The use of magnet wire enables omission of separate extension leads to the wires 106, 112 of the primary windings, which enables a more compact footprint and improves the ease of connecting the primary windings. In the example wires 106, 112, the insulation on the wires 106, 112 (e.g., enamel on magnet wire) can withstand the turn-to-turn voltage stress to be applied to the primary windings. The gauge of the wires 106, 112 may be selected based on the expected skin depth to which the current in the primary windings penetrates the wires 106, 112. In some examples, the wires 106, 112 may have a larger diameter or gauge than skin depth penetration to improve the transient thermal time constant of the primary winding and/or to fill the bobbin width needed by the secondary windings.

The example conductors 110, 116 of the secondary windings are obround aluminum conductors, which may have an extruded or rolled profile. Alternatively, the conductors 110, 116 may have a rectangular cross-section (e.g., with a minimum achievable corner radius), or a rectangular cross-section having radiused corners (e.g., an intentional corner radius). The rectangular cross-section (with or without radiused corners) may improve the coupling between the conductors 110, 116 and the wires 106, 112 and/or the cores 118, 120 relative to an obround cross-section. The example conductors 110, 116 may be copper, which would enable the conductors 110, 116 to be thinner and/or narrower for a given application, or another conductive material. In some examples, the conductors 110, 116 are provided with sufficient insulation to meet applicable standards (e.g., 0.4 mm of insulation between the primary and the secondary to meet IEC standards). Example insulation may include a 0.016 inch thick PET tube to insulate the secondary conductors 110, 116 from the primary wires 106, 112. An inexpensive insulation solution to form a PET tube may include wrapping a 0.002 inch PET sheet around a tube and securing the PET sheet with 0.001 inch PET tape to itself. By using thin PET film, the tube conforms very well to the bobbins 108, 114 and to the wires 106, 112 of the primary windings. The thin layers of PET that make up the tube are flexible and slide past each other during winding.

The obround profile of the conductors 110, 116 enables the PET tube to lay in conformance with the conductors 110, 116. In some examples, the tubes are slightly shorter than the length of the respective conductors 110, 116 so the PET tubes insulate the conductors 110, 116 as the conductors are physically routed to other circuit components. The use of the example PET tube may eliminate the need and cost of glass acrylic sleeving that conventionally corresponds to the use of Litz wire.

The lengths of the bobbins 108, 114 may be such that when the conductors 110, 116 are placed over the primary wires 106, 112 and wound, the bobbins 108, 114 provide sufficient clearance for the end portions of the secondary conductors 110, 116. The lengths of the bobbins 108, 114 may also influence the numbers and/or gauges of the primary winding wires 106, 112. The secondary conductors 110, 116 and/or the primary wires 106, 112 may be secured to the bobbins 108, 114 using PET or glass filament tape.

In some examples, the secondary conductors 110, 116 are straight when the transformer 100 is mounted to a circuit board (e.g., by screw bosses or other mounting features on the bobbins 108, 114). After mounting the transformer 100, the secondary conductors 110, 116 may be bent to route the conductors 110, 116 to the appropriate locations. For example, in a welding output application, the ends 122, 124 may be conducted to an output inductor and the ends 126, 128 may be routed to diode terminals.

Figure 6:
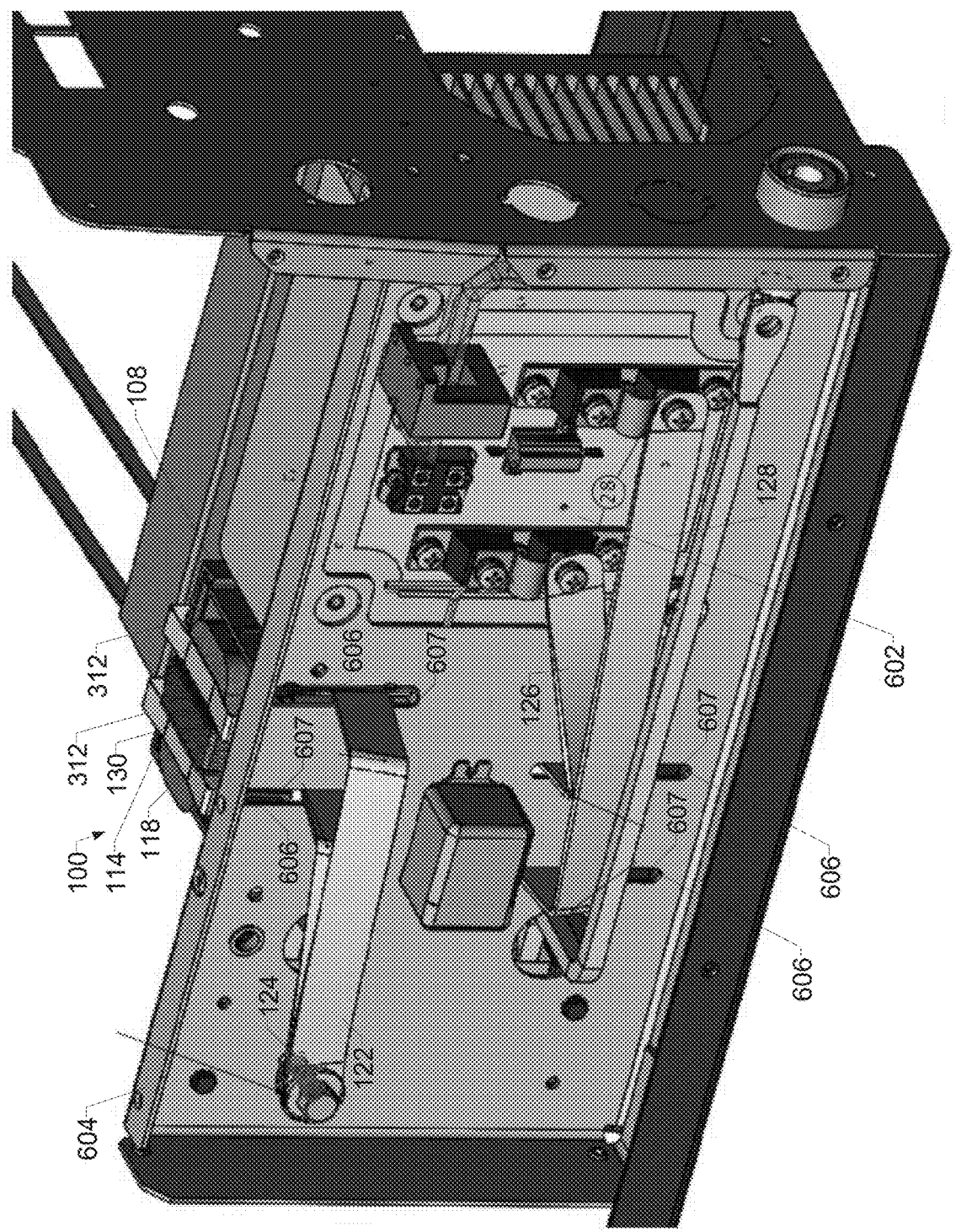
FIG. 6 illustrates an example welding-type power supply circuit board onto which the example solid wire transformer of FIG. 1 is installed, in accordance with aspects of this disclosure.

FIG. 6 illustrates an example welding-type power supply 600, including a heatsink 602 and a chassis 604, into which the example solid wire transformer 100 of FIG. 1 is installed. The example chassis 604 has slots 606 (e.g., with grommets 607) to accommodate angled portions of the secondary conductors 110, 116. The example secondary conductors 110, 116 are wound such that the ends 122, 124 of the secondary center tap extend from a same side of the transformer 100 and can be bent to the rear to line up with the appropriate location on the chassis 604. The ends 126, 12 extend from the other side of the transformer 100 and may be bent forward toward the appropriate location on heatsink 602.

Figure 7:
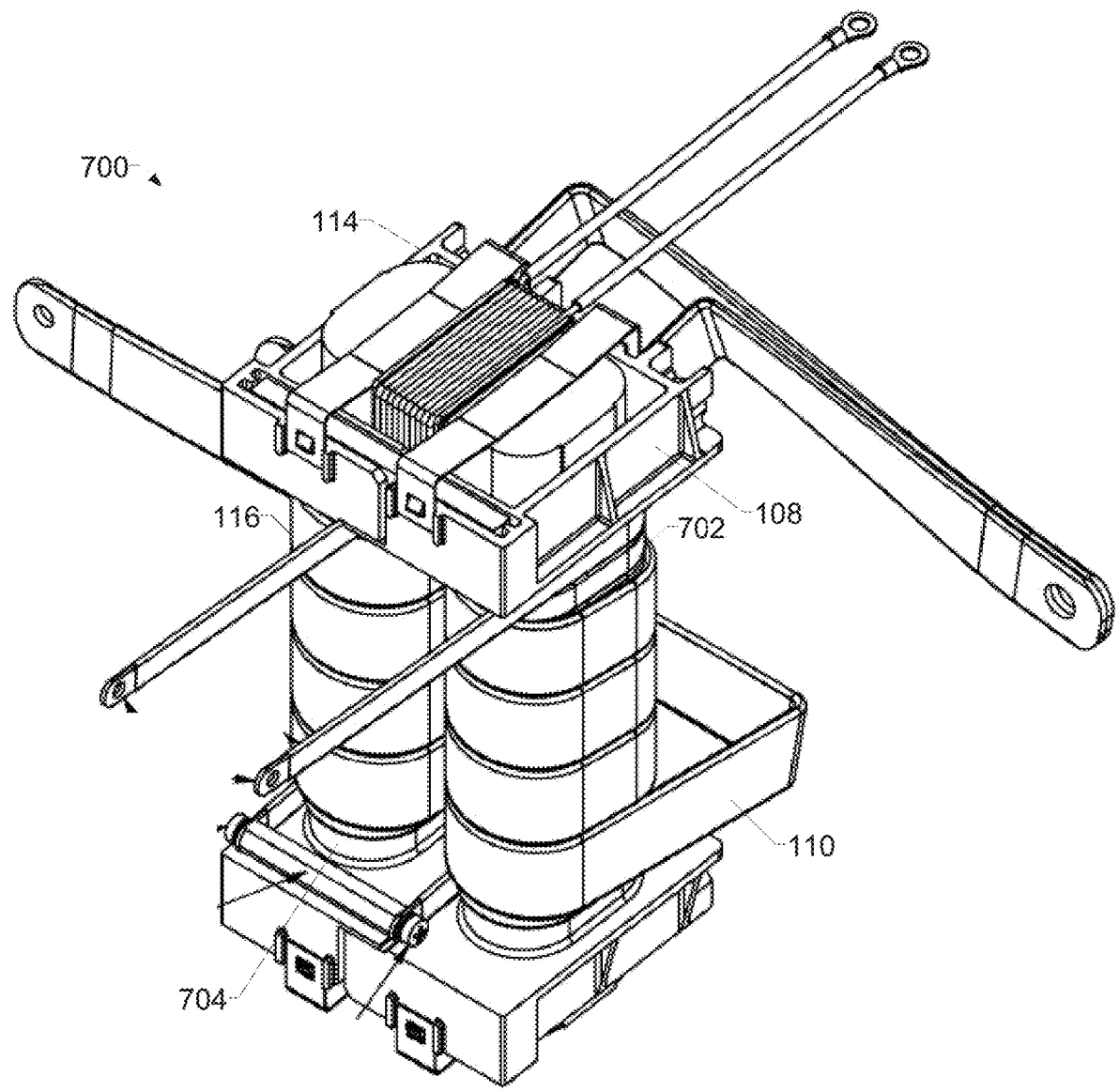
FIG. 7 is an assembled view of another example transformer including metal strips for the primary windings, in accordance with aspects of this disclosure.

FIG. 7 is an assembled view of another example transformer 700 including metal strips 702, 704 for the primary windings. The example metal strips 702, 704 may replace the round solid wires 106, 112 used in the primary windings of the transformer 100 of FIG. 1. For example, each turn of the metal strips 702, 704 may replace a corresponding set of parallel turns of the solid wires 106, 112.

The example metal strips 702, 704 are obround and provided with an insulative tube or wrap to provide inter-turn electrical isolation and electrical isolation between the metal strips 702, 704 and the secondary conductors 110, 116. Example insulation may include PET, Nomex® or Tufquin® papers, Kapton® film, and/or mylar, based on the electromagnetic and/or thermal requirements of the transformer 700. The insulation may be divided between the metal strips 702, 704 of the primary windings and the corresponding conductors 110, 116 of the secondary windings. For example, a combination of a PET tube wrapped around the metal strip 702 and a PET tube wrapped around the conductor 110 may provide a total required insulation. The example metal strips 702, 704 may be aluminum, copper, or any other appropriate material. In contrast with the example transformer 100, the metal strips 702, 704 are coupled in series instead of in parallel.

In the example of FIG. 7, the metal strips 702, 704 of the primary windings are sufficiently wide so as to function as terminals (e.g., without having separate terminals crimped or otherwise attached to the strips 702, 704).

In some examples, the cores 118, 120 and/or the bobbins 108, 114 could also be round, rectangular, or square in cross section, instead of obround, which may require pounding of the conductors 702, 704, 110, or 116 after winding, to provide adequate magnetic coupling with the cores 118, 120. Use of an obround shape for the conductors 702, 704, 110, and 116 enables the PET to lay on the conductor without bulging. The obround shape may be rectangular with some small radii. The primary and/or secondary windings could be copper (or another conductor) instead of aluminum. Aluminum is lower cost per unit of resistance than copper but is larger volumetrically.

In some examples, the secondary conductors 110, 116 are positioned such that the secondary conductors 110, 116 enter and leave the coil assemblies 102, 104, without requiring any trimming (e.g., in full width), by having sufficiently wide bobbins 108, 114 and cores 118, 120. The position and sense of the secondary conductors 110, 116 allow the routing of the secondary conductors 110, 116 outside the chassis 604 so the connections with the circuit board (e.g., the circuit board 602), can be made by bending the conductors 110, 116 along the thickness of the conductors 110, 116 instead of the width.

Using multiple magnet wires in parallel for each turn of the primary windings allows the use of a standard round magnet wire, which lay uniformly on the bobbins. The length of the bobbin is selected based on the numbers of turns needed for the secondary windings, and the gauge and/or numbers of wires are chosen to fill the length of the bobbin. The gauge of the magnet wires is chosen so as to be flexible enough to avoid extension leads on the magnet wires. The parallel connections between the primary windings cuts in half the number of wires that need to be dealt with during winding a coil.

Using 2 main coils provides more surface area that other coil structures, which improves thermal management. Winding of the secondary windings over the primary windings on the bobbins provides easier routing of the secondary conductors. The primary windings of the coil assemblies are wound in opposite directions to reduce the routing for making parallel terminations of the primary windings.

The obround cross sections of disclosed example ferrites and bobbins reduce or prevent movement of the coil around the bobbins. The obround profile also reduces or eliminates the need to pound on the secondary conductor to obtain conformance between the secondary conductor and the primary windings. The obround cross section improves ease of winding the coils and/or reduces (e.g., minimizes) leakage inductance.

While the examples above wind the secondary windings over the solid wire primary windings, in other examples the solid wire (e.g., 106, 112) may be wound over the conductors (e.g., 110, 116) of the secondary windings. For example, the conductors 110, 116 may be pre-bent prior to winding the conductors 110, 116 around the bobbins 108, 114, to enable the ends of the conductors 110, 116 to be directed to the desired location in the power supply. Additionally or alternatively, additional flexible conductors may be electromechanically attached to the conductors 110, 116 and directed away from the transformer 100 in the desired direction(s).

The solid wire 106, 112 may then be wound over the secondary windings to form the primary windings.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A welding-type power supply transformer, comprising:
a first coil assembly comprising a first plurality of turns of a first solid wire wrapped around a first bobbin to form a first single-layer primary winding, and a second plurality of turns of a first conductor over the first plurality of turns to form a first single-layer secondary winding;
a second coil assembly comprising a third plurality of turns of a second solid wire wrapped around a second bobbin to form a second single-layer primary winding, and a fourth plurality of turns of a second conductor over the third plurality of turns to form a second single-layer secondary winding, wherein:
the first single-layer primary winding is coupled in parallel with the second single-layer primary winding,
the first conductor and the second conductor each comprise at least one of an obround cross-section, a rectangular cross-section, or a rectangular cross-section having radiused corners,
the first conductor comprises a first end, a second end, and a first length extending between the first end and the second end,
the first length of the first conductor comprises a first turned portion extending over the first plurality of turns of the first solid wire and defining the second plurality of turns of the second conductor, a first end portion extending from the first end to the first turned portion, and a second end portion extending from the first turned portion to the second end,
the second conductor comprises a third end, a fourth end, and a second length extending between the third end and the fourth end,
the second length of the second conductor comprises a second turned portion extending over the third plurality of turns of the second solid wire and defining the fourth plurality of turns of the second conductor, a third end portion extending from the third end to the second turned portion, and a fourth end portion extending from the second turned portion to the fourth end,
the first length of the first conductor has a cross-section of the first conductor that is constant along at least the first turned portion of the first length of the first conductor,
the second length of the second conductor has a cross-section of the second conductor that is constant along at least the second turned portion of the second length of the second conductor,
the cross-section of the first conductor at a given point along at least the first turned portion length of the first conductor is transverse to a direction of winding of the first conductor at that point, and
the cross-section of the second conductor at a given point along at least the second turned portion of the second conductor is transverse to a direction of winding of the second conductor at that point; and
first and second cores disposed at least partially within the first and second bobbins.

2. The transformer as defined in claim 1, wherein the first solid wire comprises solid magnet wire, extruded aluminum, or rolled aluminum.

3. The transformer as defined in claim 1, wherein the first ferrite core comprises a first U-core and the second ferrite core comprises a second U-core, the first and second U-cores configured to be inserted into each of the first and second bobbins.

4. The transformer as defined in claim 3, further comprising a tertiary winding wound around a bridge portion of the first U-core.

5. The transformer as defined in claim 4, further comprising a shading ferrite configured to increase a leakage inductance of the tertiary winding.

6. The transformer as defined in claim 1, wherein the first single-layer secondary winding is configured to be coupled in series with the second single-layer secondary winding to form a multi-core secondary winding having a center-tap.

7. The transformer as defined in claim 1, wherein:
at least a portion of the first solid wire comprising the first plurality of turns comprises first insulation;
at least a portion of the second solid wire comprising the third plurality of turns comprises second insulation;
the first conductor is secured to the first bobbin and wound over the first insulation of the first solid wire; and
the second conductor is secured to the second bobbin and wound over the second solid wire.

8. The transformer as defined in claim 1, wherein each of the first plurality of turns of the first solid wire comprises a plurality of parallel windings of the first solid wire.

9. The transformer as defined in claim 1, wherein the first and second bobbins are configured to be mechanically coupled when the first and second cores are positioned within the first and second bobbins.

10. The transformer as defined in claim 1, further comprising polyethylene terephthalate (PET) tubing around at least portions of the first and second secondary windings that are adjacent the first and second primary windings.

11. The transformer as defined in claim 1, further comprising polyethylene terephthalate (PET) film wrapped around at least portions of the first and second secondary windings adjacent the first and second primary windings.

12. The transformer as defined in claim 1, wherein the first and second ferrite cores and the first and second bobbins have obround cross-sections.

13. The welding-type power supply transformer of claim 1, wherein:
the first conductor is a first obround aluminum conductor;

the second conductor is a second obround aluminum conductor;
the first bobbin comprises an obround shape; and
the second bobbin comprises an obround shape.

14. The welding-type power supply transformer of claim 1, wherein:
the first and second cores are connected by a bridge portion to form a U-core; and
the welding-type power supply transformer further comprises a tertiary winding wound around the bridge portion of the U-core.

15. A welding-type power supply, comprising:
a switched mode power supply circuit configured to convert input power at a first voltage and a first frequency to a second voltage and a second frequency; and
a high-frequency transformer configured to convert the second voltage at the second frequency to an output current, the high-frequency transformer comprising:
a first coil assembly comprising a first plurality of turns of a first solid wire wrapped around a first bobbin to form a first single-layer primary winding, and a second plurality of turns of a first conductor over the first plurality of turns to form a first single-layer secondary winding;
a second coil assembly comprising a third plurality of turns of a second solid wire wrapped around a second bobbin to form a second single-layer primary winding, and a fourth plurality of turns of a second conductor over the third plurality of turns to form a second single-layer secondary winding, wherein:
the first single-layer primary winding is coupled in parallel with the second single-layer primary winding,
the first conductor and the second conductor each comprise at least one of an obround cross-section, a rectangular cross-section, or a rectangular cross-section having radiused corners,
the first conductor comprises a first end, a second end, and a first length extending between the first end and the second end,
the first length of the first conductor comprises a first turned portion extending over the first plurality of turns of the first solid wire and defining the second plurality of turns of the second conductor, a first end portion extending from the first end to the first turned portion, and a second end portion extending from the first turned portion to the second end,
the second conductor comprises a third end, a fourth end, and a second length extending between the third end and the fourth end,
the second length of the second conductor comprises a second turned portion extending over the third plurality of turns of the second solid wire and defining the fourth plurality of turns of the second conductor, a third end portion extending from the third end to the second turned portion, and a fourth end portion extending from the second turned portion to the fourth end,
the first length of the first conductor has a cross-section of the first conductor that is constant along at least the first turned portion of the first length of the first conductor,
the second length of the second conductor has a cross-section of the second conductor that is constant along at least the second turned portion of the second length of the second conductor,
the cross-section of the first conductor at a given point along at least the first turned portion of the first conductor is transverse to a direction of winding of the first conductor at that point, and
the cross-section of the second conductor at a given point along at least the second turned portion of the second conductor is transverse to a direction of winding of the second conductor at that point; and
first and second cores disposed at least partially within the first and second bobbins.

16. The welding-type power supply as defined in claim 15, wherein the first bobbin comprises mounting feet configured to secure the high-frequency transformer to the welding-type power supply.

17. The welding-type power supply as defined in claim 15, wherein the first bobbin comprises one or more clips configured to cooperate with the first and second bobbins to secure the first and second cores to the first and second bobbins.

18. A welding-type power supply transformer, comprising:
a first coil assembly comprising a first plurality of turns of a first solid wire wrapped around a first bobbin to form a first single-layer primary winding, and a second plurality of turns of a first conductor over the first plurality of turns to form a first single-layer secondary winding; a second coil assembly comprising a third plurality of turns of a second solid wire wrapped around a second bobbin to form a second single-layer primary winding, and a fourth plurality of turns of a second conductor over the third plurality of turns to form a second single-layer secondary winding, wherein: the first single-layer primary winding is coupled in parallel with the second single-layer primary winding to form a multi-core primary winding the first conductor and the second conductor each comprise at least one of an obround cross-section, a rectangular cross-section, or a rectangular cross-section having radiused corners, the first conductor comprises a first end, a second end, and a first length extending between the first end and the second end, the first length of the first conductor comprises a first turned portion extending over the first plurality of turns of the first solid wire and defining the second plurality of turns of the second conductor, a first end portion extending from the first end to the first turned portion, and a second end portion extending from the first turned portion to the second end, the second conductor comprises a third end, a fourth end, and a second length extending between the third end and the fourth end, the second length of the second conductor comprises a second turned portion extending over the third plurality of turns of the second solid wire and defining the fourth plurality of turns of the second conductor, a third end portion extending from the third end to the second turned portion, and a fourth end portion extending from the second turned portion to the fourth end, the first length of the first conductor has a cross-section of the first conductor that is constant along at least the first turned portion of the first length of the first conductor, and the second length of the second conductor has a cross-section of the second conductor that is constant along at least the second turned portion of the second length of the second conductor the cross-section of the first conductor at a given point along at least the first turned portion of the first conductor is transverse to a direction of winding of the first conductor at that point, and the cross-section of the second conductor at a given point along at least the second turned portion of the second conductor is transverse to a direction of winding of the second conductor at that point.

* * * * *